United States Patent [19]

Philipp et al.

[11] 4,262,067
[45] Apr. 14, 1981

[54] IN-SITU CROSS LINKING OF POLYVINYL ALCOHOL

[75] Inventors: Warren H. Philipp, North Olmsted; Li-Chen Hsu, Westlake; Dean W. Sheibley, Sandusky, all of Ohio

[73] Assignee: The United States of America as represented by the Administrator of the National Aeronautics and Space Administration, Washington, D.C.

[21] Appl. No.: 113,014

[22] Filed: Jan. 18, 1980

Related U.S. Application Data

[63] Continuation of Ser. No. 971,475, Dec. 20, 1978, abandoned.

[51] Int. Cl.$^3$ .......................... C08F 8/28; H01M 2/00; H01M 2/16; H01M 2/18
[52] U.S. Cl. ...................................... 429/139; 429/27; 429/28; 429/249; 429/253; 264/104; 264/105; 525/61
[58] Field of Search ................... 525/61; 264/104, 105; 429/27, 28, 253, 139, 249

[56] References Cited

U.S. PATENT DOCUMENTS

| | | | |
|---|---|---|---|
| 2,169,250 | 8/1939 | Izard | 526/7 |
| 3,034,999 | 5/1962 | Wilson | 526/7 |

*Primary Examiner*—Stanford M. Levin
*Attorney, Agent, or Firm*—Norman T. Musial; John R. Manning; James A. Mackin

[57] ABSTRACT

A method of producing a cross-linked polyvinyl alcohol structure, such as a battery separator membrane or electrode envelope. An aqueous solution of a film-forming polyvinyl alcohol is admixed with an aldehyde cross-linking agent at basic pH to inhibit cross-linking. The cross-linking agent, preferably a dialdehyde such as glutaraldehyde, is used in an amount of from about $\frac{1}{2}$ to about 20% of the theoretical amount required to cross-link all of the hydroxyl groups of the polymer. The aqueous admixture is formed into a desired physical shape, such as by casting a sheet of the solution. The sheet is then dried to form a self-supporting film. Cross-linking is then effected by immersing the film in aqueous acid solution. The resultant product has excellent properties for use as a battery separator, including a low electrical resistivity, the value of which is principally determined by the amount of cross-linking which is easily and closely controlled by the amount of cross-linking agent added to the polymer.

7 Claims, No Drawings

IN-SITU CROSS LINKING OF POLYVINYL ALCOHOL

ORIGIN OF THE INVENTION

The invention described herein was made by employees of the United States Government and may be manufactured and used by or for the Government for governmental purposes without the payment of any royalties thereon or therefor.

This is a continuation of application Ser. No. 971,475, filed Dec. 20, 1978, now abandoned.

FIELD OF THE INVENTION

The present invention relates to a polyvinyl alcohol structure and a method for producing such a structure and, more specifically, to a method for the in-situ self cross-linking of polyvinyl alcohol which is particularly useful in producing battery separator films.

BACKGROUND OF THE INVENTION

The use of polyvinyl alcohol as a separator material in alkaline batteries is well known. A standard electrolyte for alkaline batteries is concentrated aqueous potassium hydroxide. Although polyvinyl alcohol is soluble in water, it is not readily dissolved in such a concentrated potassium hydroxide solution, and thus, films of this material can be used in such electrolytes. In general, polyvinyl alcohol films have been utilized as battery separators because of their high conductivity in alkaline electrolytes and their ease of fabrication from aqueous solution.

Efforts have been made to improve the mechanical properties and chemical stability of polyvinyl alcohol by synthesizing numerous derivatives of the polymer. However, the number of processes for the in-situ reaction of prefabricated polyvinyl alcohol structures, such as battery separators, is limited. The in-situ acetalization of polyvinyl alcohol separators has been achieved through treatment of the separators with acid solutions of aldehydes, such as an aqueous formaldehyde solution containing a small amount of sulfuric acid. The aldehyde acetalates the 1,3-diol units present in the polymer thereby creating tough, water insoluble derivatives. In many of the aldehyde treatments, the extent of acetalization is difficult to control. Extensive acetalization of polyvinyl alcohol leads to poor conductivity in alkaline electrolyte, which is probably due to the decreased number of hydrophilic alcohol groups resulting from the using up of such groups by the acetalization reaction.

It is an object of the present invention to provide a method of making cross-linked polyvinyl alcohol structures in which the extent of cross-linking is easily controlled. It is a further object to provide cross-linked polyvinyl alcohol structures having low electrical resistivity suitable for use as a separator or electrode envelope in an alkaline battery.

BRIEF SUMMARY OF THE INVENTION

The foregoing and other objects which will be apparent to those having ordinary skill in the art are achieved in accordance with the present invention by providing a method of producing a cross-linked polyvinyl alcohol element which includes the steps of: providing an aqueous admixture of a film-forming polyvinyl alcohol resin and an aldehyde cross-linking agent capable of cross-linking the polyvinyl alcohol resin, the aldehyde being present in an amount of from 0.5 to 20% of the theoretical amount required to react with all of the hydroxyl groups of the polyvinyl alcohol resin, the aqueous admixture having a basic pH to inhibit a cross-linking reaction between the aldehyde and the resin; forming the aqueous admixture into a desired physical shape; drying the shaped admixture to form a self-supporting polymeric article containing the cross-linking agent; and contacting the polymeric article with an aqueous acid catalyst solution to effect the cross-linking reaction between said resin and said aldehyde to produce a cross-linked polyvinyl alcohol element.

Other features and advantages of the invention will be apparent from the description of preferred embodiments which follows.

DESCRIPTION OF PREFERRED EMBODIMENTS

The polyvinyl alcohol resin useful in the invention is a conventional, film-forming, polymeric material readily available commercially and can be of the type used heretofore for making separators for alkaline batteries. Commercially available polyvinyl alcohol normally contains about 0.5 to 6% of 1,2-diol units in the predominantly 1,3-diol structure. The presence of 1,2-diol units in the chain results in reduced resistance to oxidation. Accordingly, it is preferred, in the practice of the present invention, to use a polyvinyl alcohol substantially free (i.e. containing less than about 5%) of 1,2-diol units. Polyvinyl alcohol having an essentially head-to-tail structure of this type is readily available. It is made by the alcoholysis of polyvinyl acetate having an essentially head-to-tail structure which is made by low temperature polymerization of vinyl acetate. In the event that a polyvinyl alcohol having a substantial amount of 1,2-diol units is employed, of if it is desired to reduce or eliminate the amount of 1,2-diol units that may be present in the polyvinyl alcohol, then it is preferred to contact the present polymer film with an oxidizing agent (e.g. periodic acid) prior to effecting cross-linking, as disclosed in our co-pending application Ser. No. 897,829, filed Apr. 19, 1978, now U.S. Pat. No. 4,154,912, issued May 15, 1979, the disclosure of which is herein incorporated by reference. The polyvinyl alcohol is a film-forming resin having, generally, a number average molecular weight of 10,000–200,000 and is conveniently provided and used in aqueous solution such as 10–20% resin by weight.

The cross-linking agent is an aldehyde and preferably a dialdehyde. Suitable dialdehydes include glyoxal and other dialdehydes which may be represented by the formula

wherein R is a divalent organic radical such as an aliphatic, cycloaliphatic, aromatic, and heterocyclic radical. Preferred dialdehydes include glutaraldehyde and other aliphatic dialdehydes wherein R is a divalent aliphatic hydrocarbon radical having from 1 to 12 carbon atoms, preferably 1 to 6 carbon atoms, and furan aldehydes, e.g. furan dialdehyde, represented by the formula:

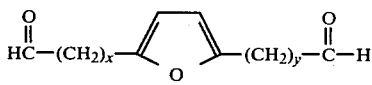

where x and y are each 0 or 2. Other aldehydes, however, may be used, for example, the polyaldehyde-polysaccharide compounds disclosed in our co-pending application Ser. No. 145,271 filed Apr. 30, 1980, entitled "Cross-Linked Polyvinyl Alcohol and Method of Making Same", the disclosure of which is herein incorporated by reference. In general, the aldehyde is one which forms a homogeneous admixture with the polyvinyl alcohol polymer.

The aldehyde cross-linking agent is preferably provided as an aqueous solution or dispersion for ease of mixing with the polyvinyl alcohol which is also preferably provided in aqueous solution. In any event, the polymer and cross-linking agent are admixed, preferably in aqueous solution. The cross-linking agent is used in an amount of 0.5 to 20% of the theoretical amount required to cross-link all of the available hydroxyl groups of the polymer. As will be apparent from the Examples which follow, the electrical resistivity of the cross-linked polymer is dependent upon the amount of cross-linking agent admixed. Since low electrical resistivity is desired, a minimum amount of cross-linking agent is preferred provided, of course, that the desirable physical properties achieved by cross-linking are maintained. Accordingly, it is preferred to employ about 0.5% to 5% or 0.5% to 10% (of theoretical) of the cross-linking agent. Since the amount of agent added is closely controlled by the simple expedient of weighing or measuring the volume of the agent added, precise control of cross-linking in the product is readily achieved.

The admixture of resin and cross-linking agent is preferably first formed into a self-supporting structure, such as a film having a thickness suitable for a particular intended use. For example, an aqueous solution of the admixture may be cast into a sheet having a dry thickness of 50 to 400 microns suitable for use as a separator for an alkaline battery. Cross-linking is then effected by contacting the sheet material with an acid catalyst such as a 1% aqueous sulfuric acid solution containing a dissolved salt, such as ammonium sulfate, present in an amount sufficient to substantially prevent dissolution of the non-cross-linked polymer in the acid solution. The reaction system is preferably heated to accelerate the reaction. A temperature in excess of 40° C., preferably 50°-80° C. is suitable. A reaction time of several hours is generally sufficient.

The acid catalyst can be any acid such as sulfuric acid, hydrochloric acid, etc., suitable to catalyze the cross-linking reaction between the aldehyde-containing cross-linking agent and the hydroxyl-containing polymer. An aqueous acid solution is preferred. Various salts, such as sodium sulfate, potassium sulfate, or the like, can be used to prevent dissolution of the non-cross-linked polymer.

In making battery separators, the sheet or other self-supporting structure containing the admixed resin and cross-linking agent can be cut or otherwise treated, prior to effecting cross-linking, to provide a physical configuration suitable for an intended use such as a battery separator. For example, a film dried to a thickness of 50-400 microns can be cut into sheets of appropriate size (e.g. 3"×4") and envelope bags can be fabricated by sealing the edges of superposed sheets. Sealing is readily accomplished by heat sealing or by suitable adhesive. A heat sealing temperature of about 200° C. is appropriate. A preferred adhesive is a solution of admixed resin and cross-linking agent similar to that from which the film was cast.

While a sheet thickness of 50–400 microns, preferably 100–200 microns, is customary for use as separators or electrode envelopes in conventional alkaline batteries, the sheet structures may be substantially thinner, e.g. 10 microns, and substantially thicker, e.g. – inch, for more specialized applications.

The invention is further illustrated in the Examples which follow.

EXAMPLE 1

To four separate batches of 10% aqueous poly(vinyl alcohol) solutions (Polyscience Inc. viscosity 55–65 cp. for 4% resin solids in water) is added the specified quantity of 50% aqueous glutaraldehyde to make solutions containing the following glutaraldehyde concentrations based on the amount of poly(vinyl alcohol) present: 2½%, 5%, 10%, and 20%. In order to prevent premature acetalization, the casting solution is made alkaline to litmus paper by addition of several drops of concentrated aqueous ammonia. To make the films, the well mixed viscous solution is cast on a smooth clean glass surface with the aid of a Gardner knife and the cast sheet is air dried at room temperature. The dried film having a thickness of about 150 to 180 microns thick is easily removed from the glass. To effect cross-linking, the film is immersed in the following solution at about 70° C. for about 15 minutes:

Water: 1 liter
conc. $H_2SO_4$: 20 ml
$Na_2SO_4$: 200 grams

Following this treatment, the film is immersed in about 1% HCl at about 70° C. for about one half hour to complete the cross-linking reaction. The cross-linked film, which is no longer water soluble, is washed with water, then immersed in dilute sodium bicarbonate solution to neutralize absorbed acid, and finally rinsed with water again to remove salts. The treated film is air dried at room temperature. The resistivities of these cross-linked films at several glutaraldehyde concentrations is shown in the table below.

| | RESISTIVITY OF FILMS IN 45% KOH | | |
|---|---|---|---|
| Film | Percent Glutaraldehyde | Film Thickness Microns | Resistivity ohm-$cm^2$ |
| A | 20 | 170 | greater than 100 |
| B | 10 | 160 | 2.72 |
| C | 5 | 160 | 0.89 |
| D | 2½ | 160 | 0.49 |

For high conductivity in alkaline electrolyte, a low degree of cross-linking is more desirable. Accordingly, film D is the best in this respect.

EXAMPLE 2

Use of low molecular weight instead of high molecular weight poly(vinyl alcohol).

To two separate batches of 20% aqueous poly(vinyl alcohol) solution having a lower molecular weight than that of Example 1, (Polysciences Inc. viscosity 4–6 (ps., 4% in water) is added the specified quantity of 50% aqueous glutaraldehyde to make solutions containing the following glutaraldehyde concentrations based on the amount of poly(vinyl alcohol) present: 2½% and 10%. The casting and treatment is as described in Example 1. The resistivities of the cross-linked poly(vinyl alcohol) films is shown in the following table.

| | RESISTIVITY OF FILM IN AQUEOUS 45% KOH | | |
|---|---|---|---|
| Film | Percent Glutaraldehyde | Film Thickness Microns | Resistivity ohm-cm² |
| A | 10 | 170 | 1.33 |
| B | 2½ | 170 | 0.46 |

As is the case in Example 1, high conductivity in alkaline electrolyte is favored by a low degree of cross-linking. For both the high and the low molecular weight poly(vinyl alcohol) films of Examples 1 and 2, good mechanical properties in concentrated alkaline electrolyte were found down to ½% by weight glutaraldehyde in the poly(vinyl alcohol) films, and the conductivity of such films is high.

EXAMPLE 3

To a 10% aqueous solution of polyvinyl alcohol (Polyscience Inc. viscosity 55–65 cps., 4% in water) was added about 10% by weight (based on the amount of polyvinyl alcohol) of furan dialdehyde (Quaker Oats). Dried film having a thickness of about 150μ is prepared and processed as described in Example 1. Electrical resistivity of the cross-linked film is 2.997 ohms-cm².

EXAMPLE 4

The same procedure as in Example 3 is followed except that the amount of furan dialdehyde added is 7% based on the weight of the polyvinyl alcohol, and the polyvinyl alcohol used has a viscosity of 4 cps. (4% in water). The film is 150 microns thick and has an electrical resistivity of 0.170 ohms-cm².

What is claimed is:

1. An alkaline battery having a cross linked polyvinyl alcohol separator made by providing an aqueous admixture of a film-forming polyvinyl alcohol resin and an aldehyde cross-linking agent capable of cross-linking the polyvinyl alcohol resin, said aldehyde being a dialdehyde having the formula

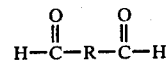

wherein R is a divalent organic radical having from 1 to 12 carbon atoms, said aldehyde being present in an amount required to react with from 0.5 to 20% of all the hydroxyl groups of the polyvinyl alcohol resin, said aqueous admixture having a basic pH to inhibit a cross-linking reaction between the aldehyde and the resin; forming said aqueous admixture into a sheet drying the shaped admixture to form a self-supporting polymeric sheet containing said cross-linking agent; and contacting said polymeric sheet with an aqueous acid catalyst solution to effect the cross-linking reaction between said resin and said aldehyde to produce a cross-linked polyvinyl alcohol separator.

2. A battery according to claim 1 wherein said polyvinyl alcohol has a number average molecular weight of from 10,000 to 200,000 and is provided in an aqueous solution.

3. A battery according to claim 1 wherein R is a divalent aliphatic hydrocarbon radical.

4. A battery according to claim 3 wherein said dialdehyde is glutaraldehyde.

5. A battery according to claim 3 wherein said dialdehyde has the formula

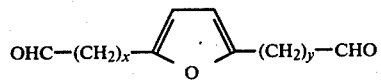

wherein x and y are each 0 or 2.

6. A battery according to claim 5 wherein x and y are each 0.

7. A battery according to claim 1 wherein two of the sheets are superposed and joined at their edges to form an envelope bag for an electrode of an alkaline battery prior to effecting said cross-linking reaction.

* * * * *